(12) United States Patent (10) Patent No.: US 12,618,476 B2

Huang et al. (45) Date of Patent: May 5, 2026

(54) ELECTRONIC EXPANSION VALVE AND REFRIGERATION DEVICE

(71) Applicant: GUANGDONG WELLING MOTOR MANUFACTURING CO., LTD., Foshan (CN)

(72) Inventors: Longhua Huang, Foshan (CN); Chao Chen, Foshan (CN); Mao Yang, Foshan (CN); Bo Jiang, Foshan (CN)

(73) Assignee: GUANGDONG WELLING MOTOR MANUFACTURING CO., LTD., Foshan (CN)

( * ) Notice: Subject to any disclaimer, the term of this patent is extended or adjusted under 35 U.S.C. 154(b) by 50 days.

(21) Appl. No.: 18/205,210

(22) Filed: Jun. 2, 2023

(65) Prior Publication Data

US 2023/0304587 A1 Sep. 28, 2023

Related U.S. Application Data

(63) Continuation of application No. PCT/CN2021/120607, filed on Sep. 26, 2021.

(30) Foreign Application Priority Data

Dec. 14, 2020 (CN) .......................... 202011483239.0

(51) Int. Cl.
  *F16K 1/42* (2006.01)
  *F16K 1/02* (2006.01)
  *F25B 41/31* (2021.01)
(52) U.S. Cl.
  CPC .................. *F16K 1/42* (2013.01); *F16K 1/02* (2013.01); *F25B 41/31* (2021.01)

(58) Field of Classification Search
  CPC ...................................... F16K 1/02; F16K 1/42
  (Continued)

(56) References Cited

U.S. PATENT DOCUMENTS

| | | | | | |
|---|---|---|---|---|---|
| 5,626,030 | A | * | 5/1997 | Nagai | F16K 1/54 137/599.11 |
| 6,460,567 | B1 | * | 10/2002 | Hansen, III | F16K 31/04 137/625.48 |

(Continued)

FOREIGN PATENT DOCUMENTS

| | | | | | |
|---|---|---|---|---|---|
| CN | 104565401 | A | * | 4/2015 | F16K 1/32 |
| CN | 105276200 | A | * | 1/2016 | F16K 1/02 |

(Continued)

OTHER PUBLICATIONS

Translation of CN-104565401- (Year: 2013).*

(Continued)

*Primary Examiner* — Umashankar Venkatesan

(74) *Attorney, Agent, or Firm* — Scully, Scott, Murphy & Presser, P.C.

(57) ABSTRACT

An electronic expansion valve and a refrigeration device are provided. The electronic expansion valve has a valve seat, a nut and a connection piece. The valve seat is provided with a valve cavity. One end of the nut is installed in the valve cavity. An outer wall of the nut is provided with an annular position part that extends from the outer wall. The position part is positioned to be in contact with a wall of the valve cavity. One end of the connection piece is fixedly connected to the nut. Another end of the connection piece is extended away from the nut and fixedly connected to an axial end surface of the valve seat.

13 Claims, 5 Drawing Sheets

(58) Field of Classification Search
USPC ...................................................... 251/129.11
See application file for complete search history.

(56) References Cited

U.S. PATENT DOCUMENTS

| | | | | |
|---|---|---|---|---|
| 7,494,108 | B2 * | 2/2009 | Inoue | F16K 31/04 |
| | | | | 251/129.11 |
| 8,556,229 | B2 * | 10/2013 | Lv | F16K 31/047 |
| | | | | 251/264 |
| 9,726,406 | B2 * | 8/2017 | Sekiguchi | F25B 41/35 |
| 10,935,155 | B2 * | 3/2021 | Zhang | F25B 41/35 |
| 10,948,099 | B2 * | 3/2021 | Matsumoto | F16K 31/047 |
| 11,261,974 | B2 * | 3/2022 | Wei | F25B 41/30 |
| 11,698,146 | B2 * | 7/2023 | Zhang | F25B 25/005 |
| | | | | 29/832 |
| 11,761,544 | B2 * | 9/2023 | Fujimoto | F25B 41/35 |
| | | | | 251/324 |
| 2015/0129067 | A1 | 5/2015 | Zhan et al. | |
| 2019/0368618 | A1 | 12/2019 | Wei | |
| 2022/0275868 | A1 * | 9/2022 | Huang | F16K 31/04 |

FOREIGN PATENT DOCUMENTS

| | | | |
|---|---|---|---|
| CN | 107289144 | A | 10/2017 |
| CN | 107917276 | A | 4/2018 |
| CN | 108953620 | A | 12/2018 |
| CN | 209012453 | U | 6/2019 |
| CN | 110836271 | A | 2/2020 |
| CN | 110836562 | A | 2/2020 |
| CN | 211145371 | U | 7/2020 |
| CN | 211175614 | U | 8/2020 |
| CN | 111853252 | A | 10/2020 |
| CN | 112524261 | A | 3/2021 |
| CN | 213954361 | U | 8/2021 |
| CN | 116428371 | A | 7/2023 |
| JP | 2000213660 | A | 8/2000 |
| JP | 2006077955 | A | 3/2006 |
| JP | 2013164124 | A | 8/2013 |
| JP | 2016023710 | A | 2/2016 |
| JP | 2019132394 | A | 8/2019 |
| JP | 2020128782 | A | 8/2020 |
| JP | 2020173004 | A | 10/2020 |

OTHER PUBLICATIONS

Translation of CN 105276200 (Year: 2016).*
International Search Report and Written Opinion dated Jan. 6, 2022 received in International Application No. PCT/CN2021/120607.
Notice of Reasons for Refusal dated Jan. 23, 2024 received in Japanese Patent Application No. JP 2023-532421.
Extended European Search Report dated Apr. 4, 2024 received in European Patent Application No. EP 21905195.0.
Notice of Reasons for Refusal dated Jan. 7, 2025 received in Japanese Patent Application No. 2023-532421.
First Office Action dated Dec. 20, 2024 received in Chinese Patent Application No. 202011483239.0.
Second Office Action dated May 9, 2025 received in Chinese Patent Application No. 202011483239.0.
First Office Action dated Jun. 17, 2025 received in Chinese Patent Application No. 202310597515.3.
Notice of reasons for Refusal dated Jul. 1, 2025 received in Japanese Patent Application No. 2023-532421.

* cited by examiner

ELECTRONIC EXPANSION VALVE AND REFRIGERATION DEVICE

CROSS-REFERENCE TO RELATED APPLICATIONS

The present application is a continuation application of PCT International Patent Application No. PCT/CN2021/120607, filed on Sep. 26, 2021, which claims priority to and benefits of Chinese Patent Application No. 202011483239.0, filed on Dec. 14, 2020, the entire contents of each of which are incorporated herein by reference for all purposes. No new matter has been introduced.

FIELD

The present application relates to the field of fluid control, and in particular, to an electronic expansion valve and a refrigeration device.

BACKGROUND

In air conditioners, refrigerators, heat pump water heaters and various refrigeration and heating equipment, electronic expansion valves are usually used to regulate the flow of fluid.

In the related art, an electronic expansion valve usually includes a valve seat assembly, a nut assembly, and a valve needle assembly. The valve seat assembly is provided with a valve port and moves relative to the nut assembly, so as to drive the valve needle to open or close the valve port, thereby adjusting the flow. In the prior art, the electronic expansion valve is easy to be stuck when the components in the electronic expansion valve are matched with each other, which affects the working performance of the electronic expansion valve.

SUMMARY

The main purpose of the present application is to provide an electronic expansion valve, aiming at solving the problem in the related art that the electronic expansion valve is easy to be stuck.

In order to achieve at least the above purpose, the present application provides an electronic expansion valve including a valve seat, a nut and a connection piece. The valve seat is provided with a valve cavity. One end of the nut is provided in the valve cavity, an outer wall of the nut is protruded is protruded with an annular position part, and the position part is positioned in contact with a wall of the valve cavity. One end of the connection piece is fixedly connected to the nut, and another end of the connection piece is extended away from the nut and is fixedly connected to an axial end surface of the valve cavity.

In an embodiment of the present application, the position part includes a cylindrical connection section in interference fit with an inner wall of the valve seat.

In an embodiment of the present application, the position part further includes a guide section connected to the connection section, the guide section is provided at a side of the connection section away from the connection piece, and an outer diameter of the guide section is less than an outer diameter of the connection section.

In an embodiment of the present application, the outer diameter of the guide section is gradually decreased from an end connected to the connection section toward an end away from the connection section.

In an embodiment of the present application, a balance channel is provided between the position part and the valve seat, and the balance channel is configured to communicate two sides of the position part in an axial direction.

In an embodiment of the present application, the connection piece is provided with a balance hole, the balance hole is configured to communicate two sides of the connection piece in the axial direction, and the balance hole is communicated with the balance channel.

In an embodiment of the present application, the connection piece is spaced apart from the position part, the connection piece, the position part and the valve seat are enclosed to form a first cavity, and both the balance channel and the balance hole are communicated with the first cavity.

In an embodiment of the present application, the balance channel is provided at the position part.

In an embodiment of the present application, the balance channel is provided on the valve seat.

In an embodiment of the present application, the connection piece is welded to the valve seat.

In an embodiment of the present application, the electronic expansion valve further includes a valve stem; a valve needle part connected to the valve stem; and a valve core seat provided on the valve seat. The nut includes a thread section matched with the valve stem, and a fixing section connected to the thread section, the fixing section is extended in a direction towards the valve core seat, and the valve needle part is in a guide match with the fixing section, and both the connection piece and the position part are provided at an outer wall of the fixing section.

In an embodiment of the present application, the fixing section includes an installation part connected to the thread section, and an extension part, both the connection piece and the position part are provided on an outer wall of the installation part, one end of the extension part is connected to the installation part, and another end of the extension part is extended towards an axial direction of the valve core seat.

In an embodiment of the present application, an outer wall of the extension part and the position part are provided in a shape of steps, and an outer diameter of the extension part is smaller than an outer diameter of the position part.

In an embodiment of the present application, the extension part is spaced apart from the valve core seat.

In an embodiment of the present application, the extension part is provided with a diversion through hole.

In an embodiment of the present application, a plurality of the diversion through holes are provided, and the plurality of diversion through holes are provided around a periphery of the extension part at intervals.

In an embodiment of the present application, the extension part, the installation part, and the position part are integrally formed.

In order to achieve the above objective, the present application further provides a refrigeration device, including the above electronic expansion valve; the electronic expansion valve includes a valve seat, a nut, and a connection piece, the valve seat is provided with a valve cavity; one end of the nut is provided in the valve cavity, an outer wall of the nut is protruded with an annular position part, and the position part is positioned in contact with a wall of the valve cavity; one end of the connection piece is fixedly connected to the nut, another end of the connection piece is extended away from the nut, and is fixedly connected to an axial end surface of the valve seat.

In the technical solution of the present application, the nut assembly is improved by including a nut and a connection piece fixedly connected to the nut. One end of the nut is provided in the valve cavity of the valve seat, an outer wall of the nut is protruded with an annular position part, and the position part is positioned in contact with a wall of the valve cavity to realize a radial positioning of the nut and the valve seat. One end of the connection piece is fixedly connected to the nut, and another end of the connection piece is extended away from the nut and is fixedly connected to an axial end surface of the valve seat to axially position the nut and the valve seat, to axially and radially position the nut and the valve seat. Thus, the positioning and matching of the nut and the valve seat is ensured, a proper alignment between the nut and the valve core seat is ensured, the stuck phenomenon is prevented and the working performance of the electronic expansion valve is improved.

BRIEF DESCRIPTION OF THE DRAWINGS

In order to more clearly illustrate the technical solutions in the embodiments of the present application or in the related art, drawings used in the embodiments or in the related art will be briefly described below. Obviously, the drawings in the following description are only some embodiments of the present application. It will be apparent to those skilled in the art that other figures can be obtained according to the structures shown in the drawings without creative work.

Figure 1:
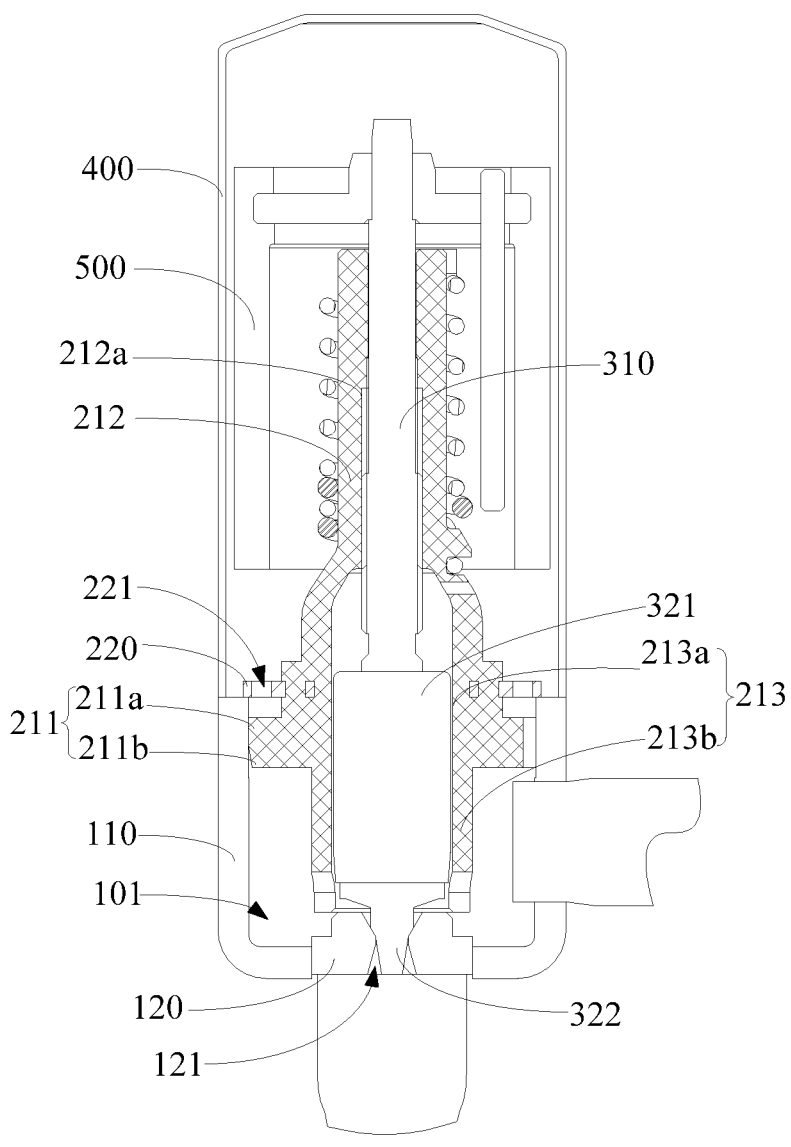
FIG. 1 is a schematic structural view of an electronic expansion valve according to an embodiment of the present application.

Description of reference signs is provided in the following table.

| Reference sign | Name |
|---|---|
| 100 | valve seat assembly |
| 110 | valve seat |
| 101 | valve cavity |
| 102 | first cavity |
| 103 | balance channel |
| 120 | valve core seat |
| 121 | valve port |
| 200 | nut assembly |
| 210 | nut |
| 211 | position part |
| 211a | connection section |
| 211b | guide section |
| 212 | thread section |
| 212a | thread |
| 213 | fixing section |
| 213a | installation part |
| 213b | extension part |
| 201 | diversion channel |
| 220 | connection piece |
| 221 | balance hole |
| 300 | valve needle assembly |
| 310 | valve stem |
| 320 | valve needle part |

-continued

| Reference sign | Name |
|---|---|
| 321 | valve needle sleeve |
| 322 | valve needle |
| 400 | housing |
| 500 | rotor assembly |

The realization of the objective, functional characteristics, and advantages of the present application are further described with reference to the accompanying drawings.

DETAILED DESCRIPTION OF EMBODIMENTS

The technical solutions in the embodiments of the present application will be clearly and completely described below with reference to the drawings in the embodiment of the present application. Obviously, the described embodiments are only a part of the embodiments of the present application, not all of the embodiments. Based on the embodiments in the present application, all other embodiments perceived by those ordinary skills in the art without creative effort should be fallen within the protection scope of the present application.

It should be noted that all of the directional instructions in the embodiments of the present application (such as, up, down, left, right, front, rear) are only used to explain the relative position relationship and movement of each component under a specific attitude (as shown in the drawings), if the specific attitude changes, the directional instructions will change correspondingly.

Besides, the descriptions in the present application that refer to "first," "second," etc. are only for descriptive purposes and are not to be interpreted as indicating or implying relative importance or to implicitly indicate the number of technical features indicated. Thus, a feature defined as "first" or "second" may explicitly or implicitly include at least one of the features. In addition, technical solutions among the embodiments can be combined with each other, but must be based on the realization of the technical solutions by those skilled in the art, and when the technical solutions are contradictory to each other or cannot be realized, the technical solutions should be considered that the combination does not exist, and the technical solutions are not fallen within the protection scope claimed in the present application.

The present application provides an electronic expansion valve.

In the embodiment of the present application, as shown in FIG. 1 to FIG. 5, the electronic expansion valve includes a valve seat assembly 100, a nut assembly 200, a valve needle assembly 300, and a housing 400.

The valve seat assembly 100 includes a valve seat 110 and a valve core seat 120, and the valve core seat 120 is provided with a valve port 121. The housing 400 is provided on the valve seat 110, and is enclosed with the valve seat 110 to form a cavity for containing the nut assembly 200, the valve needle assembly 300 and the rotor assembly 500. Thus, integrity and sealing of the overall structure of the electronic expansion valve can be achieved. The nut assembly 200 is fixedly connected to the valve seat 110, the valve needle assembly 300 is movably provided in the nut assembly 200, so as to move up and down along the axial direction of the nut assembly 200, and to be close to or away from the valve port 121 of the valve core seat 120. Thus, the function of blocking or opening the valve port 121 can be realized. At the same time, the function of adjusting an opening of the electronic expansion valve can be realized according to the distance between the valve needle assembly 300 and the valve core seat 120 or the degree of extension into the valve port 121, thereby adjusting the fluid flow.

The nut assembly 200 includes a nut 210 and a connection piece 220. One end of the nut 210 is provided in the valve cavity 101 of the valve seat 110. The outer wall of the nut 210 is protruded with an annular position part 211. The position part 211 is connected to the valve cavity 101. One end of the connection piece 220 is fixedly connected to the nut 210, and another end of the connection piece 220 is extended away from the nut 21 and is fixedly connected to the axial end surface of the valve seat 110.

It can be understood that the nut 210 functions to install and guide the valve needle assembly 300 so that the valve needle assembly 300 can be moved axially in the nut 210 to effective block the valve port 121 or open the valve port 122. The connection piece 220 functions to fixedly connect the nut 210 and the valve seat 110 to ensure the stability of the structure. The outer wall of the nut 210 is protruded with a position part 211, and the position part 211 is positioned in contact with the inner wall of the valve seat 110 to realize the radial positioning of the nut 210 and the valve seat 110. At the same time, through the fixedly connection between the connection piece 220 and the axial end surface of the valve seat 110, the axial positioning of the nut 210 and the valve seat 110 is achieved, thereby ensuring the function of both the radial and axial positioning between the nut 210 and the valve seat 110, that is, ensuring the proper alignment between the nut 210 and the valve seat 110. Thus, the proper alignment between the nut 210 and the valve core seat 120 on the valve seat 110 can be achieved, so that the valve needle assembly 300 can enter or move away from the valve port 121 more smoothly, which prevents the stuck phenomenon of the electronic expansion valve and improves the working performance of the electronic expansion valve.

In the actual application process, the shape and structure of the position part 211 can be determined according to the actual situation. For example, the position part 211 can be provided as an annular structure. When the position part 211 is annular structure, the position part 211 is formed a concentric annular structure with the nut 210 around the circumferential of the nut 210. Then, the outer wall of the position part 211 is in contact with the inner wall of the valve seat 110 to radially position the nut 210 and the valve seat 110. It should be noted that when the position part 211 is an annular structure, the position part 211 can be an annular convex stripe structure, or a cylindrical structure with a certain axial length. In this embodiment, considering the positioning effect and the convenience of processing, the position part 211 adopts a cylindrical structure with a certain axial length. The outer cylindrical surface of the position part 211 is in contact with the inner cylindrical surface of the valve seat 110, which further increases the contact area and improves the circumferential positioning effect.

In an embodiment, the position of the position part 211 can also be determined according to the actual situation. For example, the position part 211 can be provided at a position where the nut 210 is close to the valve core seat 120, or it can be provided at a position where the nut 210 is close to the end surface of the valve seat 110, or it is provided in a middle position corresponding to the inside of the valve seat 110, as long as the position part 211 can enter the valve cavity 101 of the valve seat 110 and be positioned in contact with the inner wall of the valve seat 110 during installation. It can be understood that if the connection piece 220 is connected between the nut 210 and the valve seat 110, the outer diameter of the connection piece 220 will be larger than the inner diameter of the valve seat 110. In an embodiment, the position part 211 can be provided on a side of the connection piece 220 towards the valve cavity 101. In the actual installation process, the connection piece 220 is fixedly connected to the nut 210 first, and then the side of the nut 210 provided with the position part 211 is inserted into the valve cavity 101 of the valve seat 110. At this time, the position part 211 is positioned to be in contact with the valve seat 110 to ensure the circumferential positioning. At the same time, the connection piece 220 and the end surface of the valve seat 110 are limited to position the nut 210 in the axial direction of the valve seat 110, and then the connection piece 220 is fixedly connected to the valve seat 110 to realize the stable matching between the nut 210 and the valve seat 110, which not only simplifies the installation but also ensures the proper alignment between the nut 210 and the valve seat 110.

In an embodiment, the connection piece 220 is welded and fixed to the valve seat 110 to ensure the stability of the structure and prevent the electronic expansion valve from being disengaged due to high internal pressure. The connection piece 220 can be integrally formed with the nut 210 by using a hot-melt process. The connection piece 220 is made of metal material, and the nut 210 is made of non-metal material.

In the electronic expansion valve of the technical solution of the present application, the nut assembly 200 is improved. The nut assembly 200 includes a nut 210 and a connection piece 220 fixedly connected to the nut 210, and one end of the nut 210 is provided in the valve cavity 101 of the valve seat 110. The outer wall of the nut 210 is protruded with a position part 211, and the position part 211 is positioned to be in contact with the cavity wall of the valve cavity 101 to realize the radial positioning of the nut 210 and the valve seat 110. One end of the connection piece 220 is fixedly connected to the nut 210, and another end of the connection piece 220 is extended away from the nut 210 and is fixedly connected to the axial end surface of the valve seat 110 to axially position the nut 210 and the valve seat 110, and to further axially and radially position the nut 210 and the valve seat 110. Thus, proper alignment between the nut 210 and the valve seat 110 can be ensured, proper alignment between the nut 210 and the valve core seat 120 can be ensured, the stuck phenomenon of the electronic expansion valve can be prevented, and working performance of the electronic expansion valve can be improved.

Figure 2:
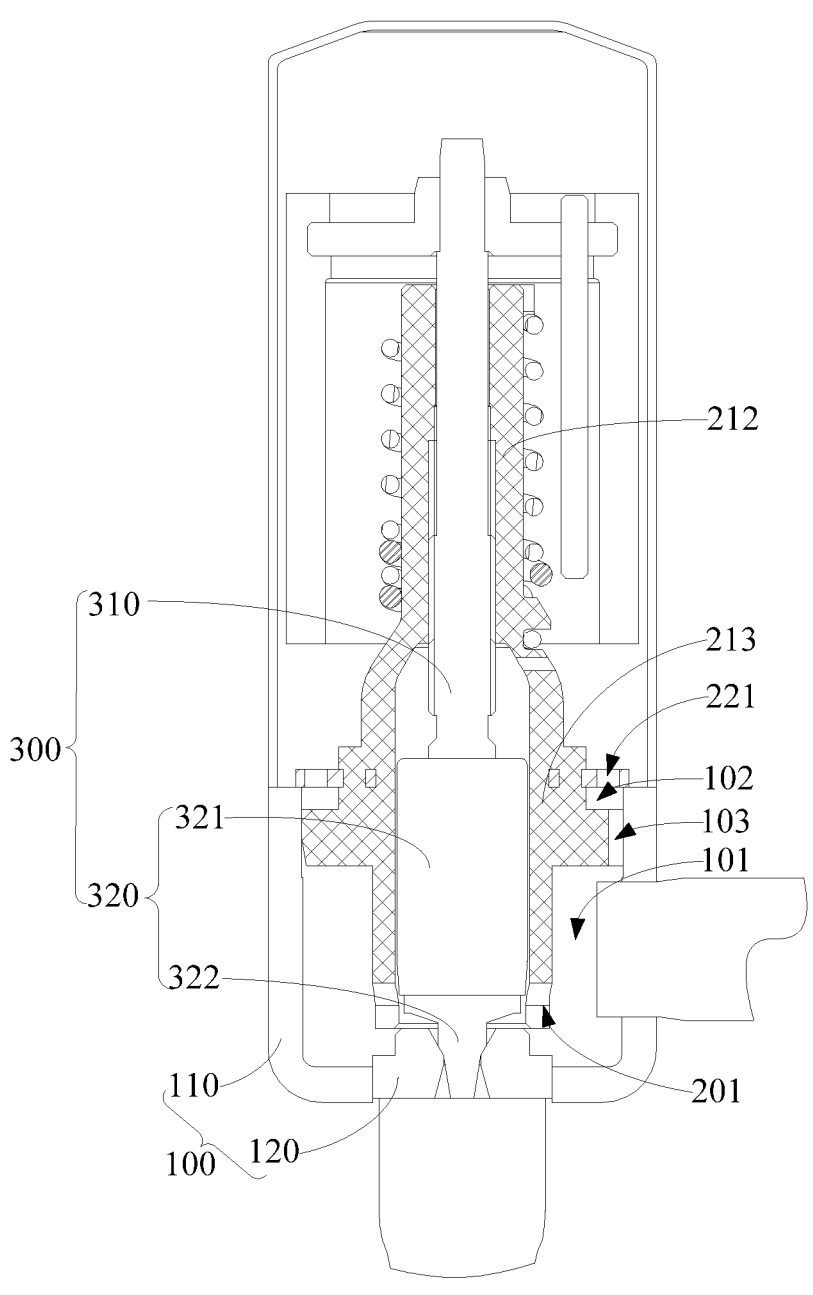
FIG. 2 is another schematic structural view of the electronic expansion valve according to an embodiment of the present application.
Figure 3:
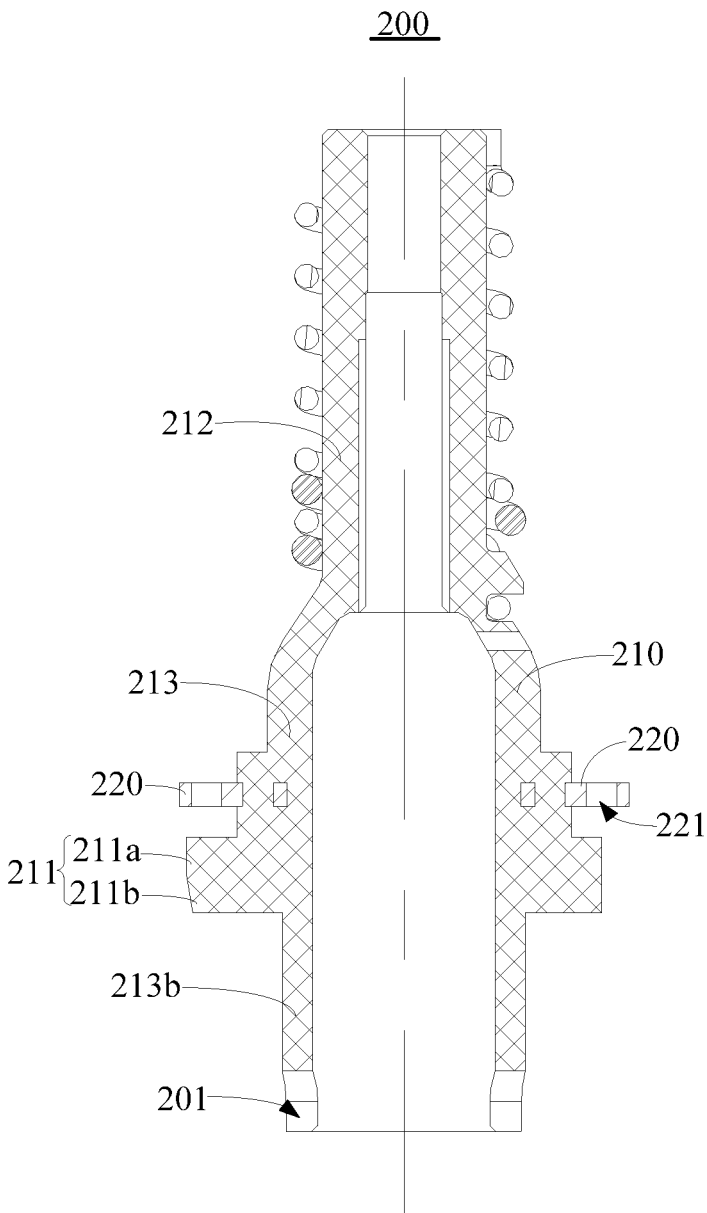
FIG. 3 is a schematic structural view of a nut assembly in the electronic expansion valve according to an embodiment of the present application.

In order to further improve the structural stability of the nut 210 and the valve seat 110, referring to FIG. 1 to FIG. 3, in an embodiment of the present application, the position part 211 includes a cylindrical connection section 211a, and the connection section 211a is in interference fit with an inner wall of the valve seat 110. It can be understood that the connection section 211a functions to position and install, and the connection section 211a is in interference fit with the inner wall of the valve seat 110, realizing the function of fixed connection between the connection section 211a and the valve seat 110, ensuring the positioning effect of the position part 211 and the valve seat 110, thereby radially positioning the nut 210 and the valve seat 110. On the basis of the foregoing embodiments, the connection section 211a may be a cylindrical structure, and the outer wall of the connection section 211a is a cylindrical surface to increase the positioning area with the valve seat 110 and further ensure the positioning effect.

In an embodiment, in order to facilitate installation, the position part 211 further includes a guide section 211*b* connected to the connection section 211*a*, and the guide section 211*b* is provided on a side of the connection section 211*a* close to the valve core seat 120. The outer diameter of the guide section 211*b* is smaller than the outer diameter of the connection section 211*a*.

In the actual installation process, the side of the nut 210 provided with the position part 211 is inserted into the valve seat 110, and the outer diameter of the connection section 211*a* of the position part 211 and the inner diameter of the valve seat 110 are in an interference fit. A side of the connection section 211*a* close to the valve core seat 120 is provided with the guide section 211*b*, and the outer diameter of guide section 211*b* is smaller than the outer diameter of the connection section 211*a*, then the outer diameter of guide section 211*b* is smaller than the inner diameter of the valve seat 110, so that the guide section 211*b* guides the installation of the nut 210, and the position part 211 can enter the valve cavity 101 of the valve seat 110 more quickly.

In an embodiment, the shape and structure of the guide section 211*b* can be determined according to actual conditions, such as a cylindrical structure, a conical structure, or a slope structure and the like. In this embodiment, considering the annular structure of the nut 210 and the valve seat 110, in order to achieve a satisfactory guiding effect, an annular structure is also adopted for the guide section 211*b*. The outer wall of the guide section 211*b* is conical, and the outer diameter of the guide section 211*b* is gradually decreased from an end connected to the connection section 211*a* toward an end away from the connection section 211*a*. It can be understood that the outer diameter of the position part 211 gradually increases and then maintains stability along the axial direction away from the valve core seat 120. In an embodiment, on the outer wall of the position part 211, the connection position between the guide section 211*b* and the connection section 211*a* can be rounded to improve the smoothness of the connection therebetween, so that under the guidance of the guide section 211*b*, the connection section 211*a* can slide into the valve cavity 101 of the valve seat 110 more easily, and the installation efficiency of the position part 211 and the valve seat 110 is improved.

In order to ensure the stability of the internal pressure of the electronic expansion valve, in an embodiment of the present application, as shown in FIG. 1 to FIG. 3, a balance channel 103 is provided between the position part 211 and the valve seat 110 to communicate with two sides of the position part 211 in the axial direction.

It can be understood that, on the basis of the foregoing embodiments, the outer wall of the position part 211 is in interference fit with the cavity wall of the valve cavity 101, and the positioning match between the position part 211 and the valve seat 110 divides two sides of the position part 211 in the axial direction into two areas. By providing the balance channel 103 between the position part 211 and the valve seat 110, the areas on both sides of the position part 211 in the axial direction are communicated, that is, the upper area of the position part 211 is communicated with the lower valve cavity 101. Thus, pressure balance on two sides of the position part 211 in the axial direction can be ensured, and uneven pressure from affecting the performance of the electronic expansion valve can be prevented.

In the actual application process, the shape and structure of the balance channel 103 can be determined according to the actual situation, such as cylindrical through holes, tapered through holes or oblique holes, curved through holes and other special-shaped through holes; it can also be structures such as grooves or notches. The quantity of the balance channels 103 can also be determined according to the actual situation. For example, a plurality of balance channels 103 can be provided at intervals on the periphery of the position part 211 or the inner wall of the valve seat 110, so that the fluid passing through the balance channels 103 is more balanced.

Figure 4:
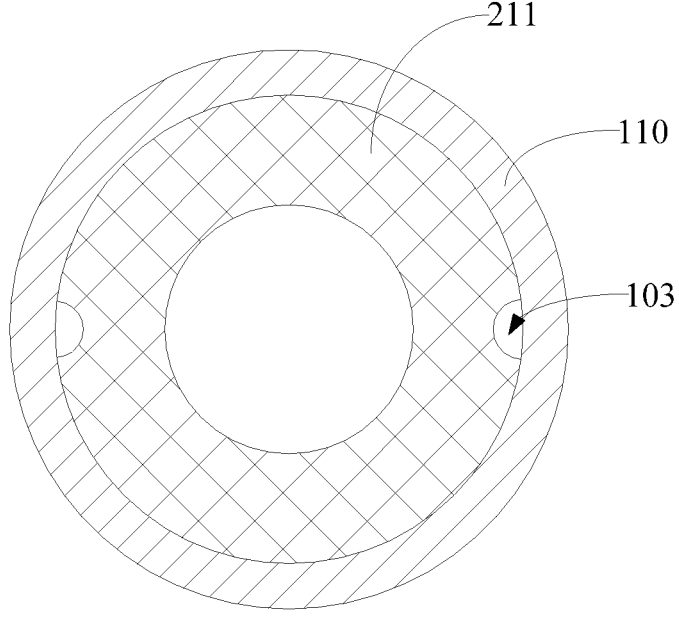
FIG. 4 is a schematic structural view of a matching between a position part and a valve seat in an embodiment of the present application.
Figure 5:
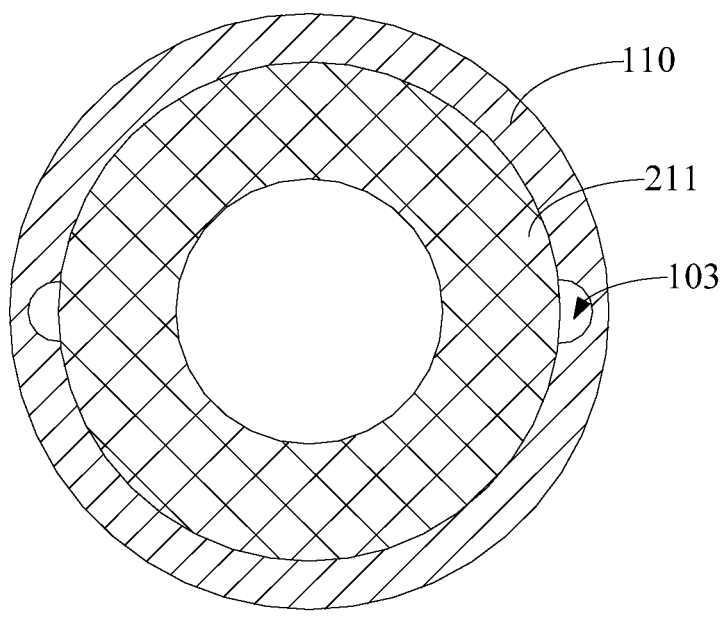
FIG. 5 is another schematic structural view of the matching between the position part and the valve seat according to an embodiment of the present application.

In this embodiment, as shown in FIG. 4 and FIG. 5, the position of the balance channel 103 can be determined according to the actual situation, such as the balance channel 103 can be provided at the position part 211; or the balance channel 103 can be provided at the inner wall of the valve seat 110. When the balance channel 103 is provided on the position part 211, it may be a through hole structure on the position part 211, or a notch structure or a groove structure formed by concaving the outer wall of the position part 211. When the balance channel 103 is provided on the inner wall of the valve seat 110, it may be a notch or a groove structure or the like that is concaved on the inner wall of the valve seat 110.

In an embodiment, as shown in FIG. 1 to FIG. 3, the connection piece 220 is provided with a balance hole 221, and the balance hole 221 is communicated with two sides of the connection piece 220 in the axial direction, and the balance hole 221 is communicated with the balance channel 103.

It can be understood that one end of the connection piece 220 is fixed to the nut 210, and another end of the connection piece 220 is extended to the valve seat 110, and the cavities on two sides of the connection piece 220 are separated by the connection piece 220. In order to ensure the pressure balance on two sides thereof, a balance hole 221 can be provided on the connection piece 220 to communicate with the balance channel 103 and the inner cavity of the housing 400, thereby communicating the valve cavity 101 with the inner cavity of the housing 400. Thus, the pressure of the valve cavity 101 and the inner cavity of the housing 400 is ensured to be balanced. The pressure balance in the entire electronic expansion valve is ensured and the stability of the electronic expansion valve is enhanced.

In the actual application, the shape and structure of the balance hole 221 can be determined according to the actual situation, such as a circular through hole, a square through hole or other special-shaped through holes. In an embodiment, a plurality of balance holes 221 may be provided, and the plurality of balance holes 221 are evenly distributed around the periphery of the connection piece 220 to achieve a better pressure balance effect.

In an embodiment, as shown in FIG. 1 to FIG. 3, the connection piece 220 is spaced apart from the position part 211; the connection piece 220, the position part 211 and the valve seat 110 are enclosed to form a first cavity 102; and both the balance channel 103 and the balance hole 221 are communicated with the first cavity 102.

In the actual application, the position part 211 and the connection piece 220 can be provided in close contact or at intervals. The two methods have little effect on the positioning and matching between the nut 210 and the valve seat 110, but during the installation process, the position part 211 is a structure protruding from the outer wall of the nut 210, the position part 211 and the nut 210 may be integrally formed, and the connection piece 220 is made of metal material, which needs to be fixed to the nut 210 by other methods such as hot melting or injection molding. Compared with being provided at intervals, the connection piece 220 and the position part 211 being provided in close contact has a larger operating space, thereby simplifying the difficulty of the process.

In an embodiment, the connection piece 220, the position part 211 and the valve seat 110 are enclosed to form the first cavity 102, both the balance channel 103 and the balance hole 221 are communicated with the first cavity 102, so as to communicate the cavity in the housing 400, the first cavity 102 and the valve cavity 101. Then the effect of pressure balance in the cavity of the entire electronic expansion valve is achieved, and the performance of the electronic expansion valve being affected by uneven pressure is avoided.

In an embodiment of the present application, as shown in FIG. 1 to FIG. 3, the valve needle assembly 300 includes a valve stem 310 and a valve needle part 320, and the valve needle part 320 is provided between the valve stem 310 and the valve core seat 120. The nut 210 includes a thread section 212 and a fixing section 213, and the thread section 212 is matched with the valve stem 310. The fixing section 213 is connected to the thread section 212 and is extended in a direction towards the valve core seat 120, and the valve needle part 320 is in a guide match with the fixing section 213. The connection piece 220 and the position part 211 are provided at an outer wall of the fixing section.

The thread section 212 and the fixing section 213 are two sections oppositely provided in the axial direction. The valve stem 310 is passed through the thread section 212, and is threadedly engaged with the screw thread 212a of the thread section 212. Thus, when the valve stem 310 is rotated relative to the screw thread 212a of the thread section 212, the rotations can be converted into the movement of the valve stem 310 in the axial direction, and subsequently the valve needle part 320 is driven to move axially. The inner wall of the fixing section 213 is in the guide match with the valve needle part 320 to ensure the moving stability of the valve needle part 320. The connection piece 220 and the position part 211 are both provided on the outer wall of the fixing section 213. Through the positioning match between the position part 211 and the connection piece 220 and the valve seat 110, the proper alignment between the fixing section 213 and the valve seat 110 is ensured. The fixing section 213 and the valve needle part 320 is in the guide match, so that the valve needle part 320 can enter the valve port 121 of the valve core seat 120 more smoothly, which improves the performance of the electronic expansion valve.

For example, the fixing section 213 includes an installation part 213a and an extension part 213b; the installation part 213a is connected to the thread section 212, and the connection piece 220 and the position part 211 are provided on an outer wall of the installation part 213a. One end of the extension part 213b is connected to the installation part 213a, and another end of the extension part 213b is extended towards an axial direction of the valve core seat 120. The installation part 213a functions to install and position. Both the connection piece 220 and the position part 211 are provided on the installation part 213a to ensure the proper alignment between the installation part 213a and the valve seat 110; the extension part 213b is connected to the installation part 213a and is extended towards the axial direction of the valve core seat 120 to ensure the guiding length with the valve needle part 320, thereby ensuring the proper alignment between the valve needle part 320 and the valve core seat 120.

In an embodiment, the extension part 213b, the installation part 213a and the position part 211 are integrally structured. In this embodiment, the extension part 213b extending towards the valve core seat 120 is provided on the nut 210. At the same time, the nut 210 realizes the positioning function with the valve seat 110 through the connection piece 220 and the position part 211, which saves a component of the guide sleeve when compared with the prior art that provides a guide sleeve between the nut 210 and the valve core seat 120, reduces processing and assembly steps, and reduces production and assembly costs.

In an embodiment, the outer wall of the extension part 213b and the position part 211 are provided in a shape of steps, and an outer diameter of the extension part 213b is smaller than an outer diameter of the position part 211. It can be understood that the extension part 213b is mainly functioned as guiding the inner valve needle part 320, and the position part 211 functions to abut and position with the inner wall of the outer valve seat 110, so that the outer diameter of the extension part 213b can be smaller than the outer diameter of the position part 211, which saves the material, and ensures positioning with the valve seat 110 and guiding the valve needle part 320.

In an embodiment, the extension part 213b and the valve core seat 120 are provided at intervals. It can be understood that the nut 210 is positioned with the valve seat 110 through the connection piece 220 and the position part 211 to ensure the proper alignment between the nut 210 and the valve core seat 120. At the same time, the extension part 213b is in the guide match with the valve needle part 320, so that the valve needle part 320 can be coaxial with the valve core seat 120, and the extension part 213b may not be in contact with the valve core seat 120. In an embodiment, the extension part 213b and the valve core seat 120 are provided at intervals to reduce the noise of the fluid when passing through.

In an embodiment, the extension part 213b is provided with a diversion through hole 201. The diversion through hole 201 may be a closed through hole or a notch. A plurality of the diversion through holes 201 are provided, and the plurality of diversion through holes 201 are provided at intervals around the periphery of the extension part 213b. A plurality of diversion through holes 201 are provided to increase the channels for the fluid to enter the extension part 213b. A plurality of diversion through holes 201 are provided around the periphery of the extension part 213b, so that the fluid can enter evenly from the periphery of the extension part 213b, and the structure is more stable.

In an embodiment of the present application, as shown in FIG. 1 to FIG. 3, the valve needle part 320 includes a valve needle sleeve 321 and a valve needle 322. The valve needle sleeve 321 is connected to the valve stem 310, and the valve needle sleeve 321 is in the guide match with the inner wall of the fixing section 213. The valve needle 322 is connected to the side of the valve needle sleeve 321 away from the valve stem 310. The valve stem 310 can drive the valve needle 322 along the axial direction of the nut 210 to move towards or away from the valve core seat 120 to block or open the valve port 121.

In an embodiment of the present application, as shown in FIG. 1 to FIG. 3, the electronic expansion valve further includes a rotor assembly 500. The rotor assembly 500 is provided in the housing 400 and connected to the valve needle assembly 300, and the rotor assembly 500 drives the valve needle assembly 300 to rotate, so that the valve needle assembly 300 moves in the nut 210 around the axial direction.

It can be understood that one end of the valve stem 310 is fixedly connected to the rotor assembly 500, and another end of valve stem 310 is passed through the valve needle sleeve 321 to be connected with the valve needle 322. The rotation of the rotor assembly 500 drives the valve stem 310 to rotate, and the valve stem 310 is threaded with the thread section 212, so that when the nut 210 is fixedly connected to the valve seat 110, the valve stem 310 moves along the axial direction of the nut 210 while rotating. Subsequently, the valve needle sleeve 321 is driven to axially move along the inner wall of the fixing section 213, so that the valve needle 322 is moved close to or away from the valve core seat 120 along the axial direction of the nut 210 to achieve the purpose of blocking or opening the valve port 121.

In this embodiment, one end of the valve needle 322 is installed on the valve needle sleeve 321, and another end of the valve needle 322 is inserted into the valve port 121 of the valve core seat 120. The valve needle sleeve 321 functions to guide installation by being in the guide match with the inner wall of the fixing section 213, so that the axial movement of the valve needle 322 is more stable.

The present application also provides a refrigeration device, which includes an electronic expansion valve, and the specific structure of the electronic expansion valve refers to the above-mentioned embodiments. Since this refrigeration device can be applied with the technical solutions of all the technical solutions of all the above embodiments, the refrigeration device possesses at least the beneficial effects brought by the technical solutions of the above embodiments, and will not be repeated here. In an embodiment, the electrical equipment may be an air conditioner or a refrigerator.

The above are only some embodiments of the present application, and are not intended to limit the scope of the present application. Under the inventive concept of the present application, the equivalent structural transformations made by using the description of the application and the contents of the accompanying drawings, or direct/indirect applications in other relevant technical fields are included in the scope of the present application.

What is claimed is:

1. An electronic expansion valve comprising:
a valve seat forming a valve cavity and comprising a wall;
a nut at least partially disposed within the valve cavity, the nut comprising:
an outer wall; and
a position portion protruding from the outer wall and contacting the wall of the valve seat, the position portion comprising:
a connection portion in interference fit with the wall of the valve seat; and
a tapered guide portion connected to the connection portion with a decreasing diameter away from the connection portion;
a balance channel that communicates two sides of the position portion in an axial direction;
a connection piece forming a balance hole that is in communication with the balance channel and communicates two sides of the connection piece in the axial direction, the connection piece comprising:
an inner end fixedly connected to the nut; and
an outer end away from the nut that is fixedly connected to an axial end surface of the wall of the valve seat; and
a housing comprising a housing axial end surface in contact with the axial end surface of the wall of the valve seat,
wherein:
a thickness of the wall of the valve seat is greater than a thickness of the housing at an intersection of the wall of the valve seat and the housing;

an outer surface of the wall of the valve seat and an outer surface of the housing are flush;
the outer end of the connection piece is fixedly connected to a portion of the axial end surface of the wall of the valve seat that is not connected to the housing; and
an annular gap is formed between the outer end of the connection piece and an inner wall of the housing.

2. The electronic expansion valve according to claim 1, wherein:
the connection piece is spaced apart from the position portion in the axial direction;
the connection piece, the position portion, and the wall of the valve seat form a first cavity; and
the balance channel and the balance hole communicate via the first cavity.

3. The electronic expansion valve according to claim 1, wherein the balance channel is formed by the position portion of the nut.

4. The electronic expansion valve according to claim 1, wherein the balance channel is formed by the wall of the valve seat.

5. The electronic expansion valve according to claim 1, wherein the connection piece is welded to the wall of the valve seat.

6. The electronic expansion valve according to claim 1, further comprising:
a valve stem;
a valve needle part connected to the valve stem; and
a valve core seat provided on the valve seat,
wherein:
the nut further comprises:
a thread section matched with the valve stem; and
a fixing section connected to the thread section;
the fixing section extends in a direction toward the valve core seat;
the valve needle part is matched with the fixing section; and
the connection piece and the position portion are disposed at an outer wall of the fixing section.

7. The electronic expansion valve according to claim 6, wherein:
the fixing section of the nut comprises an installation portion and an extension portion;
the installation portion is connected to the thread section;
the connection piece and the position portion are disposed on an outer wall of the installation portion;
one end of the extension portion is connected to the installation portion; and
another end of the extension portion extends in the axial direction.

8. The electronic expansion valve according to claim 7, wherein
an outer diameter of the extension portion is smaller than an outer diameter of the position portion.

9. The electronic expansion valve according to claim 7, wherein a gap is formed between the extension portion and the valve seat.

10. The electronic expansion valve according to claim 7, wherein the extension portion forms a diversion through hole.

11. The electronic expansion valve according to claim 10, wherein:
the extension portion forms a plurality of diversion through holes; and
the plurality of diversion through holes are provided around a periphery of the extension portion at intervals.

12. The electronic expansion valve according to claim 7, wherein the extension portion, the installation portion, and the position portion are integrally formed.

13. A refrigeration device comprising the electronic expansion valve according to claim 1.

* * * * *